United States Patent
Miyata (10) Patent No.: US 8,768,417 B2
(45) Date of Patent: Jul. 1, 2014

(54) BASE STATION AND METHOD FOR BEAM-FORMING IN DIRECTION OF DEGRADED RADIO TERMINAL USING TIME BAND AND FREQUENCY BAND RESOURCES

(75) Inventor: Takeo Miyata, Daito (JP)

(73) Assignee: Kyocera Corporation, Kyoto (JP)

( * ) Notice: Subject to any disclaimer, the term of this patent is extended or adjusted under 35 U.S.C. 154(b) by 173 days.

(21) Appl. No.: 13/056,638

(22) PCT Filed: Jul. 29, 2009

(86) PCT No.: PCT/JP2009/063517
§ 371 (c)(1),
(2), (4) Date: Jan. 28, 2011

(87) PCT Pub. No.: WO2010/013756
PCT Pub. Date: Feb. 4, 2010

(65) Prior Publication Data
US 2011/0130160 A1 Jun. 2, 2011

(30) Foreign Application Priority Data
Jul. 29, 2008 (JP) .................................. 2008-195537

(51) Int. Cl.
H04M 1/00 (2006.01)
(52) U.S. Cl.
USPC ...................................... 455/562.1; 455/63.4
(58) Field of Classification Search
None
See application file for complete search history.

(56) References Cited

U.S. PATENT DOCUMENTS

| 7,620,420 | B2 | 11/2009 | Higuchi et al. | |
|---|---|---|---|---|
| 7,856,559 | B2 | 12/2010 | Suzuki et al. | |
| 8,040,831 | B2* | 10/2011 | Kurtz et al. | 370/318 |
| 2005/0101352 | A1* | 5/2005 | Logothetis et al. | 455/562.1 |
| 2009/0135770 | A1* | 5/2009 | Chen et al. | 370/329 |
| 2009/0190520 | A1* | 7/2009 | Hochwald et al. | 370/315 |
| 2010/0064193 | A1* | 3/2010 | Huschke et al. | 714/748 |

FOREIGN PATENT DOCUMENTS

| CN | 1581577 A | 2/2005 |
|---|---|---|
| CN | 1764164 A | 4/2006 |
| JP | 2001-127681 | 5/2001 |

(Continued)

OTHER PUBLICATIONS

Notification of Reason(s) for Refusal for JP 2008-195537, mailed Mar. 27, 2012, 4 pages.

(Continued)

Primary Examiner — Nay A Maung
Assistant Examiner — Alejandro Rivero
(74) Attorney, Agent, or Firm — Duane Morris LLP (57) ABSTRACT

A radio base station (BS) includes: a radio communication unit (110) configured to transmit broadcast control data via an antenna unit (101) including a plurality of antennas (ANT1 to ANTn), the broadcast control data being data common to a plurality of radio terminals executing radio communication with the radio base station and being used to control the radio communication; a quality acquisition unit (121) configured to acquire quality information indicating quality of the radio communication between each of the plurality of radio terminals and the radio base station; and an identification unit (122) configured to identify, from the plurality of radio terminals, a degraded radio terminal having the quality lower than a threshold value, based on the quality information acquired by the quality acquisition unit (121). The radio communication unit (110) performs beam-forming transmission of the broadcast control data in the direction corresponding to the degraded radio terminal identified.

6 Claims, 7 Drawing Sheets

(56) References Cited

FOREIGN PATENT DOCUMENTS

| | | |
|---|---|---|
| JP | 2002-271254 | 9/2002 |
| JP | 2003-158759 | 5/2003 |
| JP | 2004-048490 | 2/2004 |
| JP | 2005-064546 | 3/2005 |
| WO | WO-2008/053754 | 5/2008 |

OTHER PUBLICATIONS

KR10-2011-7003082 Korean Office Action mailed Apr. 25, 2012.
Office Action issued on Apr. 3, 2013 in corresponding Chinese Patent Application No. 200980130110.7, 7 pages.

* cited by examiner

| USER NAME | BS TRANSMISSION CONTROL | MS USER TYPE |
|---|---|---|
| Direct User1 | ONE ANTENNA OMNI | NON-SPECIFIC USER 1 |
| Direct User2 | | NON-SPECIFIC USER 2 |
| Direct User3 | | NON-SPECIFIC USER 3 |
| SVD User1 | FOUR ANTENNAS BFS | BF SPECIFIC USER |
| SVD User2 | | BF NON-CORRESPONDING USER 1 |
| SVD User3 | | BF NON-CORRESPONDING USER 2 |

| USER NAME | BS TRANSMISSION CONTROL | MS USER TYPE |
|---|---|---|
| Direct User1 | ONE ANTENNA OMNI | NON-SPECIFIC USER 1 |
| Direct User2 | | NON-SPECIFIC USER 2 |
| Direct User3 | | NON-SPECIFIC USER 3 |
| SVD User1 | FOUR ANTENNAS BFS (CHANGE BF SPECIFIC USERS FOR EACH CLUSTER) | BF SPECIFIC USER 1 |
| SVD User2 | | BF SPECIFIC USER 2 |
| SVD User3 | | BF NON-CORRESPONDING USER 1 |
| SVD User4 | | BF NON-CORRESPONDING USER 2 |

BASE STATION AND METHOD FOR BEAM-FORMING IN DIRECTION OF DEGRADED RADIO TERMINAL USING TIME BAND AND FREQUENCY BAND RESOURCES

CROSS-REFERENCE TO RELATED APPLICATIONS

This is a U.S. National Phase Application of International Application No. PCT/JP2009/063517 filed Jul. 29, 2009, which claims priority to Japanese Patent Application No. 2008-195537 filed Jul. 29, 2008, the disclosures of which are incorporated herein by reference in their entirety.

TECHNICAL FIELD

The present invention relates to a radio base station and a radio communication method for transmitting broadcast control data used to control communication with a radio terminal.

BACKGROUND OF THE INVENTION

In a radio communication system, a radio base station generally transmits broadcast control data used to control communication with a radio terminal, more specifically, to establish and maintain radio communication. The broadcast control data is control data common to multiple radio terminals executing radio communication with the radio base station. Such broadcast control data is called MAP in WiMAX (IEEE802.16) that is a kind of radio communication system, for example, and includes data indicating an allocation result of communication channels used to transmit and receive communication data other than the broadcast control data.

In recent years, there has been widely used a radio base station configured to execute beam-forming-transmission using multiple antennas to improve communication quality in the radio communication system. The beam-forming-transmission is a control to direct a directional beam (a region with a strong electric field distribution) in a specific direction. The beam-forming-transmission allows even a radio terminal with degraded quality of communication with a radio base station (hereinafter referred to as a degraded radio terminal), such as a radio terminal located around a cell fringe, for example, to more reliably receive communication data from the radio base station.

Further, there has been proposed a method for a radio base station to diversity-transmit broadcast control data (see Patent Document 1). To be more specific, the radio base station described in Patent Document 1 transmits the broadcast control data by using a directionality pattern for directing a directional beam in predetermined multiple directions, regardless of a location of a radio terminal. Further, the radio base station uses a different directionality pattern every time it transmits the broadcast control data, thereby producing spatial and temporal diversity effects and thus improving the probability that a degraded radio terminal can normally receive the broadcast control data.

PRIOR ART DOCUMENT

Patent Document

Patent Document 1: Japanese Patent Application Publication No. 2001-127681 ([Abstract] etc.)

SUMMARY OF THE INVENTION

However, the radio base station described in Patent Document 1 directs the directional beam in the predetermined multiple directions, regardless of the location of the degraded radio terminal. As a result, the degraded radio terminal cannot always normally receive the broadcast control data. The broadcast control data is data required to establish and maintain the radio communication. Thus, there has been a problem that the degraded radio terminal cannot execute radio communication with the radio base station unless it can normally receive the broadcast control data.

Therefore, it is an objective of the present invention to provide a radio base station and a radio communication method having improved probability that a radio terminal with degraded communication quality can normally receive broadcast control data.

In order to solve the problems described above, the present invention has the following features. First of all, according to a first feature of the present invention, there is provided a radio base station (radio base station BS) comprising: a radio communication unit (radio communication unit 110) configured to transmit broadcast control data via an antenna unit (antenna unit 101) including a plurality of antennas (antennas ANT1 to ANTn), the broadcast control data being data common to a plurality of radio terminals executing radio communication with the radio base station and being used to control the radio communication; an acquisition unit (quality acquisition unit 121) configured to acquire quality information indicating quality of the radio communication between each of the plurality of radio terminals and the radio base station; and an identification unit (identification unit 122) configured to identify, from the plurality of radio terminals, a degraded radio terminal having the quality lower than a threshold value, based on the quality information acquired by the acquisition unit, wherein the radio communication unit performs beam-forming transmission of the broadcast control data in the direction corresponding to the degraded radio terminal identified by the identification unit.

According to the above aspect, the radio communication unit performs beam-forming transmission of the broadcast control data in the direction corresponding to the degraded radio terminal, thereby making it possible to improve the probability that the degraded radio terminal can normally receive the broadcast control data.

In the first feature, when there are two or more degraded radio terminals, the radio communication unit divides radio communication resources to be used for transmission of the broadcast control data, and then performs beam-forming transmission of the broadcast control data in the direction corresponding to each of the degraded radio terminals, by using one of the divided radio communication resources.

In the first feature, the radio communication resources include the antenna unit, and when there are two or more degraded radio terminals, the radio communication unit divides the plurality of antennas into antenna groups corresponding to the number of the degraded radio terminals, and then performs beam-forming transmission of the broadcast control data in the direction corresponding to each of the degraded radio terminals, by using one of the antenna groups obtained by the division.

In the first feature, the radio communication resources include a frequency band to be used for transmission of the broadcast control data, and when there are two or more degraded radio terminals, the radio communication unit divides the frequency band into frequency regions corresponding to the number of the degraded radio terminals, and then performs beam-forming transmission of the broadcast control data in the direction corresponding to each of the degraded radio terminals, by using one of the frequency regions obtained by the division.

In the first feature, the radio communication resources include a time band to be used for transmission of the broadcast control data, and when there are two or more degraded radio terminals, the radio communication unit divides the time band into time regions corresponding to the number of the degraded radio terminals, and then performs beam-forming transmission of the broadcast control data in the direction corresponding to each of the degraded radio terminals, by using one of the time regions obtained by the division.

In the first feature, the broadcast control data includes data indicating an allocation result of communication channels used to transmit and receive communication data other than the broadcast control data.

In the first feature, the radio communication unit is configured according to a multicarrier communication scheme in which a plurality of carriers are usable for transmission of the broadcast control data.

According to a second feature of the present invention, there is provided a radio communication method comprising the steps of: acquiring, by a radio base station having a plurality of antennas, quality information indicating quality of radio communication between each of a plurality of radio terminals and the radio base station; identifying, by the radio base station, a degraded radio terminal having the quality lower than a threshold value from the plurality of radio terminals, based on the quality information acquired in the acquiring step; and performing, by the radio base station, beam-forming transmission of broadcast control data in the direction corresponding to the degraded radio terminal identified in the identifying step, the broadcast control data being data common to the plurality of radio terminals and being used to control the radio communication.

According to a third feature of the present invention, there is provided a program for executing the steps of: acquiring, by a radio base station having a plurality of antennas, quality information indicating quality of radio communication between each of a plurality of radio terminals and the radio base station; identifying, by the radio base station, a degraded radio terminal having the quality lower than a threshold value from the plurality of radio terminals, based on the quality information acquired in the acquiring step; and performing, by the radio base station, beam-forming transmission of broadcast control data in the direction corresponding to the degraded radio terminal identified in the identifying step, the broadcast control data being data common to the plurality of radio terminals and being used to control the radio communication.

The present invention can provide a radio base station and a radio communication method having improved probability that a radio terminal with degraded communication quality can normally receive broadcast control data.

EMBODIMENTS FOR CARRYING OUT THE INVENTION

Next, with reference to the drawings, first and second embodiments of the present invention are described. In the following description of the drawings in the embodiments, the same or similar parts are denoted by the same or similar reference numerals.

First Embodiment

In the first embodiment, descriptions are given of (1) General Configuration of Radio Communication System, (2) Configuration of Radio Base Station, (3) Operations of Radio Base Station, (4) Concrete Example, and (5) Advantageous Effects.

(1) General Configuration of Radio Communication System

Figure 1:
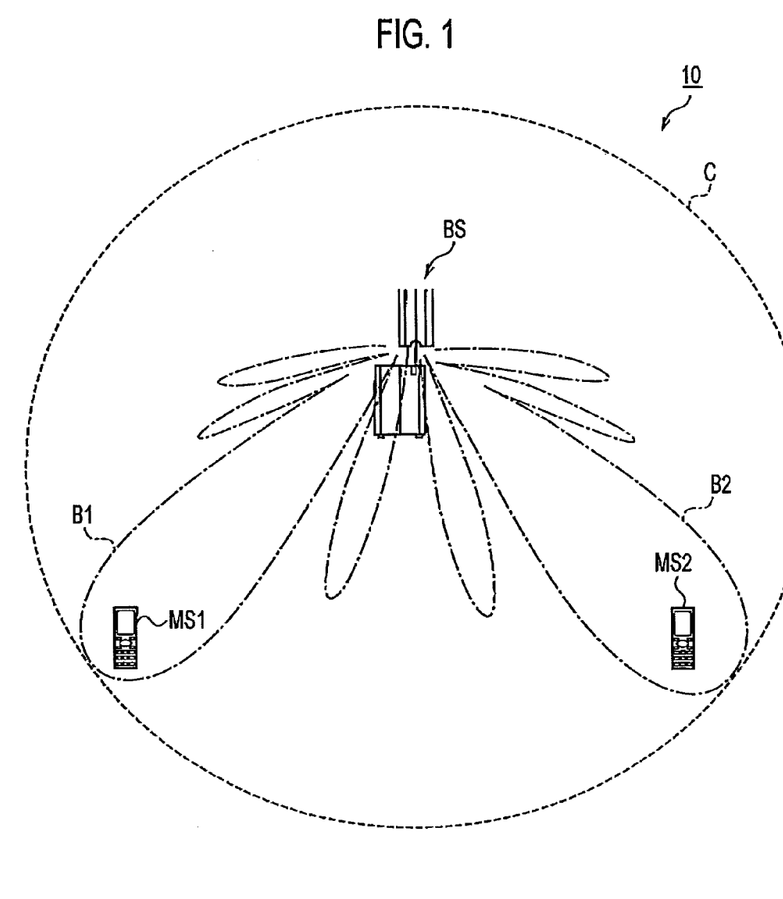
FIG. 1 is a general configuration diagram of an entire radio communication system according to a first embodiment.

FIG. 1 is a general configuration diagram of an entire radio communication system 10 according to the first embodiment. As shown in FIG. 1, the radio communication system 10 includes a radio base station BS, a radio terminal MS1 and a radio terminal MS2.

The radio terminals MS1 and MS2 are located in a cell C formed by the radio base station BS, and execute radio communication with the radio base station BS. FIG. 1 shows two radio terminals, but actually many more radio terminals may execute radio communication with the radio base station BS.

The radio base station BS allocates communication channels to the radio terminals MS1 and MS2, respectively, and executes radio communication with the radio terminals MS1 and MS2 via the allocated communication channels. The radio terminals MS1 and MS2 execute radio communication with the radio base station BS via the communication channels allocated by the radio base station BS.

In the first embodiment, the radio communication system 10 has a configuration based on WiMAX (IEEE8020.16). Specifically, the radio communication system 10 adopts an orthogonal frequency division multiple access (OFDMA) scheme that is a scheme using multiple subcarriers orthogonal to each other.

The radio base station BS transmits MAP that is broadcast control data used to control the radio communication between the radio base station BS and the radio terminals MS1 and MS2. The MAP includes the communication channel allocation result, more specifically, data specifying a frequency, time and the like, which configures the communication channel allocated by the radio base station BS.

The radio base station BS needs to transmit the MAP to a radio terminal which executes radio communication with the radio base station BS. The radio terminals MS1 and MS2 cannot recognize the communication channels to be used for radio communication with the radio base station BS if they fail to receive the MAP, and thus can neither establish nor maintain the radio communication with the radio base station BS.

In FIG. 1, the radio terminals MS1 and MS2 are located at an edge portion of the cell C, i.e., at a cell fringe. Accordingly, reception quality (e.g., an SINR value) of radio signals the radio terminals MS1 and MS2 receive from the radio base station BS is low. More specifically, in the first embodiment, the radio terminals MS1 and MS2 are degraded radio terminals with degraded quality of radio communication with the radio base station BS.

The radio base station BS performs beam-forming transmission (hereinafter referred to as "BF transmission") of the MAP in a so direction corresponding to each of the radio terminals MS1 and MS2. To be more specific, the radio base station BS forms a directional beam B1 in the direction corresponding to the radio terminal MS1, and forms a directional beam B2 in the direction corresponding to the radio terminal MS2. This allows even the radio terminals MS1 and MS2 located at the cell fringe to normally receive the MAP.

Note that, in the following description, the radio terminals (including the radio terminals MS1 and MS2) which execute radio communication with the radio base station BS are collectively called the "radio terminal MS" as appropriate.

(2) Configuration of Radio Base Station

Figure 2:
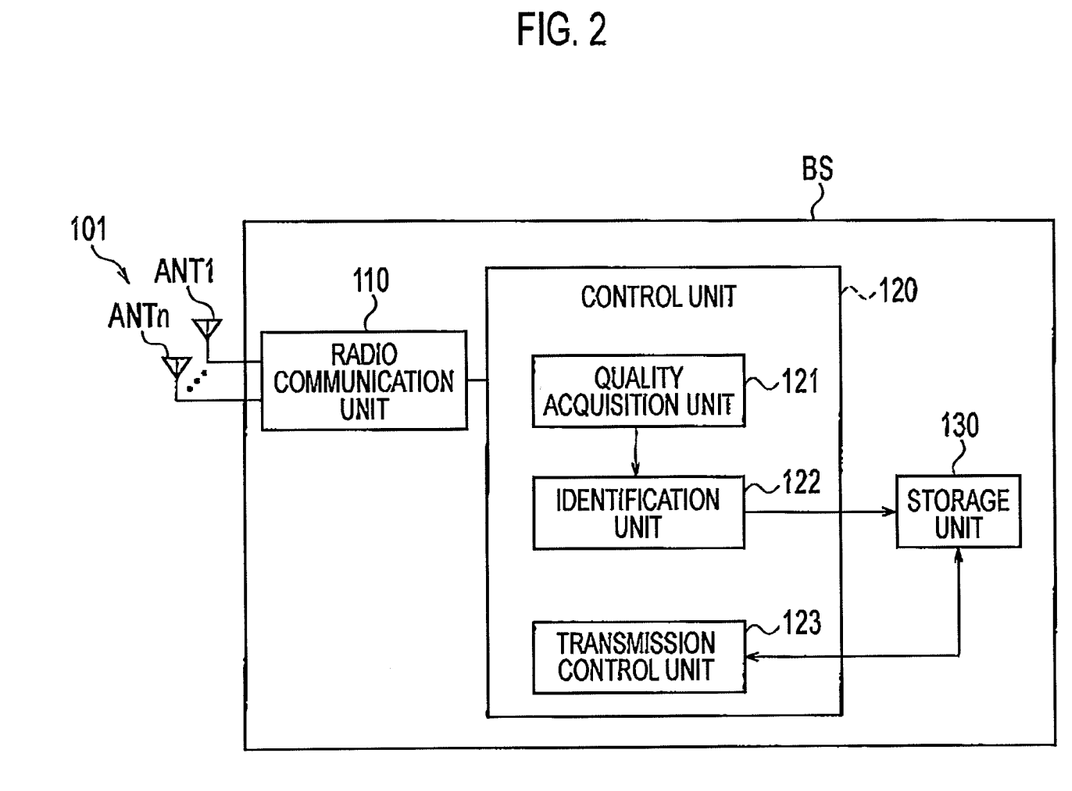
FIG. 2 is a block diagram showing a configuration of a radio base station according to the first embodiment.

FIG. 2 is a block diagram showing a configuration of the radio base station BS. FIG. 2 shows only the configuration related to the present invention. As shown in FIG. 2, the radio base station BS includes an antenna unit 101, a radio communication unit 110, a control unit 120, and a storage unit 130.

The antenna unit 101 includes multiple antennas ANT1 to ANTn, and is configured as an array antenna. For example, the antennas ANT1 to ANTn are arranged in a circular pattern, linear pattern, matrix pattern or the like.

The radio communication unit 110 performs transmission and reception of radio signals according to the OFDMA scheme. To be more specific, during transmission of the radio signal, the radio communication unit 110 disperses coded information into the subcarriers after serial/parallel conversion. Thereafter, the radio communication unit 110 subjects each of the subcarriers to primary modulation (multiphase PSK modulation, multilevel QAM modulation or the like), and then performs secondary modulation on the subcarriers by inverse fast Fourier transform (TFFT). The radio communication unit 110 decodes the received radio signal after performing primary demodulation thereon by fast Fourier transform (FFT) and then further performing secondary demodulation thereon during transmission of the radio signal.

The radio communication unit 110 further executes BF transmission using a BF transmission technology (adaptive array technology). To be more specific, the radio communication unit 110 multiplies a radio signal transmitted or received by each of the antennas ANT1 to ANTn by a weight. In other words, a directional beam of the antenna unit 101 is directed in a specific direction by adjusting the phase or amplitude of the radio signal. Weight calculation requires information on a direction of arrival of the radio signal at the radio base station BS from the radio terminal MS. For example, the radio communication unit 110 calculates a transmission weight from a radio signal transmitted from the radio terminal MS to the radio base station BS. Alternatively, the radio communication unit 110 can also specify a frequency and the like to be used for the BF transmission, thereby transmitting a signal (Sounding signal) for calculating the transmission weight to the radio terminal.

The control unit 120 is formed of a CPU, for example, and controls various functions included in the radio base station BS. The control unit 120 includes a quality acquisition unit 121, an identification unit 122, and a transmission control unit 123. The storage unit 130 is formed of a memory, for example, and stores various information to be used for control and the like in the control unit 120.

The quality acquisition unit 121 is an acquisition unit configured to acquire quality information indicating quality of radio communication between the radio terminal MS and the radio base station BS. Here, as the quality information, a signal-to-interference noise power ratio (SINR) value, a received signal field intensity (RSSI) value, an error rate value or the like can be used. In the following example, the SINR value is used. However, not only the SINR value but also a signal-to-noise power ratio (SNR) value may be used.

To be more specific, the SINR value of the radio signal the radio terminal MS has received from the radio base station BS is fed back to the radio base station BS, and the quality acquisition unit 121 acquires the SINR value fed back. Alternatively, the quality acquisition unit 121 may acquire the SINR value of the radio signal the radio base station BS has received from the radio terminal MS.

The identification unit 122 compares the SINR value acquired by the quality acquisition unit 121 with a threshold value (hereinafter referred to as a "BF determination threshold value"), and identifies, from the radio terminals MS, a degraded radio terminal having the SINR value lower than the BF determination threshold value. The storage unit 130 stores information on the identified degraded radio terminal. The transmission control unit 123 controls transmission of the MAP by referring to the information stored in the storage unit 130. Operations of the transmission control unit 123 are described in detail later.

The radio communication unit 110 BF-transmits the MAP in the direction where the degraded radio terminal identified by the identification unit 122 is located, by using some of radio communication resources to be used for MAP transmission. Here, the "radio communication resources" mean the antennas ANT1 to ANTn in the first embodiment.

When there are two or more degraded radio terminals, the radio communication unit 110 divides the antennas ANT1 to ANTn into sub-array antennas corresponding to the number of the degraded radio terminals, and then SF-transmits the MAP in the direction where each of the degraded radio terminals is located, by using each of the sub-array antennas obtained by the division. Each of the sub-array antennas is an antenna group including multiple antennas.

(3) Operations of Radio Base Station

Figure 3:
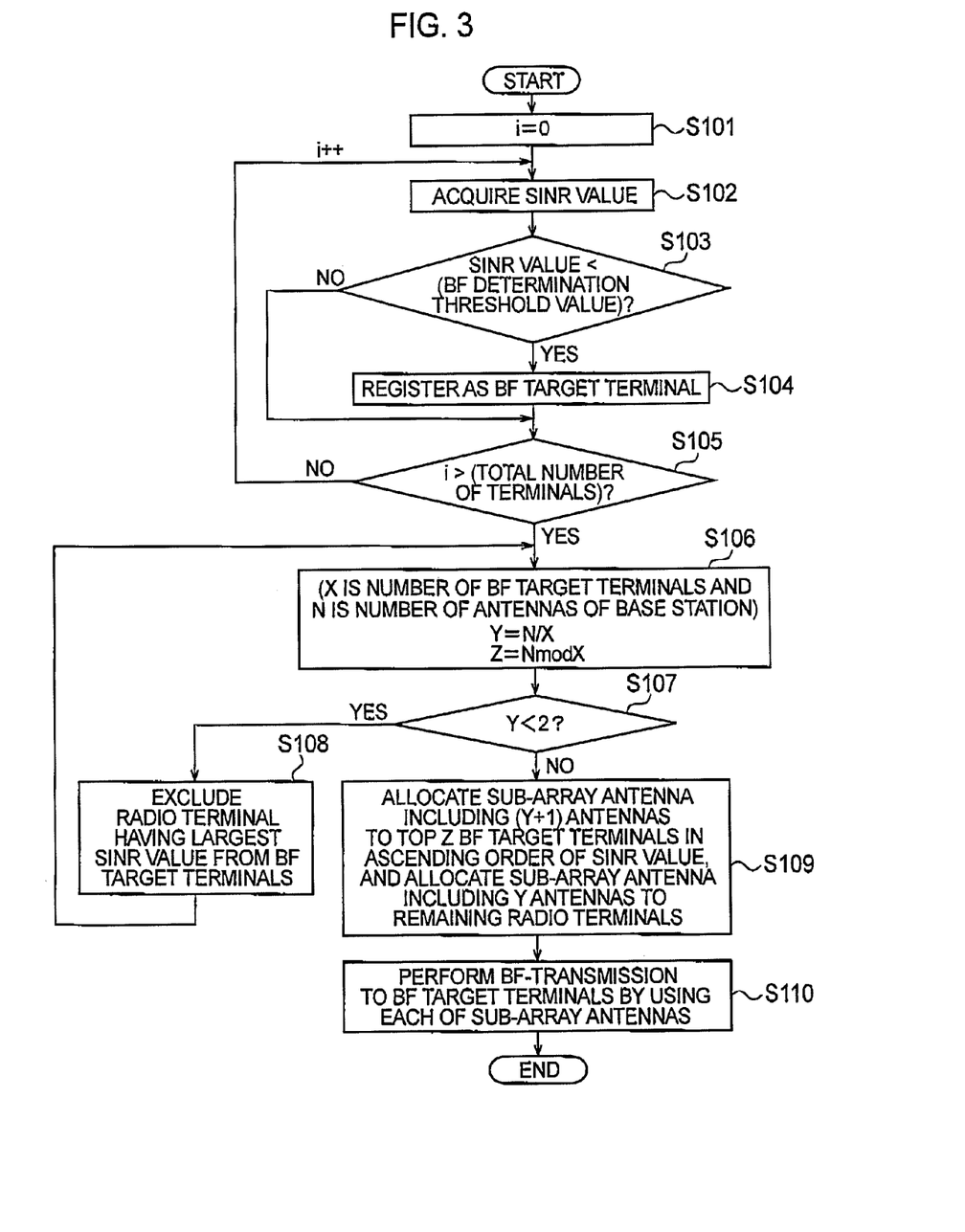
FIG. 3 is a flowchart showing operations of the radio base station according to the first embodiment.

FIG. 3 is a flowchart showing operations of the radio base station BS according to the first embodiment.

In Step S101, the control unit 120 initializes a variable i for counting the radio terminals MS to execute radio communication with the radio base station BS.

In Step S102, the quality acquisition unit 121 acquires an SINR value for the i-th radio terminal MS.

In Step S103, the identification unit 122 compares the SINR value acquired by the quality acquisition unit 121 with a BF determination threshold value. When the SINR value acquired by the quality acquisition unit 121 is smaller than the BF determination threshold value, the processing advances to Step S104. On the other hand, when the SINR value acquired by the quality acquisition unit 121 is equal to or greater than the BF determination threshold value, the processing advances to Step S105.

In Step S104, the identification unit 122 registers the i-th radio terminal as a BF target terminal (degraded radio terminal) in the storage unit 130. To be more specific, the identification unit 122 registers, in the storage unit 130, identification information for identifying the i-th radio terminal determined as the BF target terminal, and the SINE value of the i-th radio terminal in association with each other.

In Step S105, the control unit 120 determines whether or not the variable i has reached the total number of terminals which execute radio communication with the radio base station BS. When the variable i has not reached the total number of terminals, the processing returns to Step S102. On the other hand, when the variable i has reached the total number of terminals, the processing advances to Step S106.

In Step S106, the transmission control unit 123 performs calculation of the following formula (I), in which X is the number of the BF target terminals and N is the number of the antennas ANT1 to ANTn.

$$Y = N/X$$
$$Z = N \bmod X \tag{1}$$

In Step S107, the transmission control unit 123 determines whether or not the value of Y calculated in Step S106 is smaller than 2. When the value of Y is smaller than 2, the processing advances to Step S108. On the other hand, when the value of Y is equal to or greater than 2, the processing advances to Step S109.

The value of Y smaller than 2 means that only one antenna can be allocated to the BF target terminal. For this reason, in Step S108, the transmission control unit 123 excludes the radio terminal having the largest SINR value from the BF target terminals.

On the other hand, the value of Y equal to or greater than 2 means that more than one antenna can be allocated to each of the BF target terminals. Therefore, in Step S109, the transmission control unit 123 allocates a sub-array antenna including (Y+1) antennas to top Z BF target terminals in ascending order of SINR value, and allocates a sub-array antenna including Y antennas to the remaining radio terminals.

In Step S110, the radio communication unit 110 BF-transmits the MAP in the direction where each of the BF target terminals is located, by using each of the sub-array antennas allocated to the BF target terminals by the transmission control unit 123.

(4) Concrete Example

Figure 4:
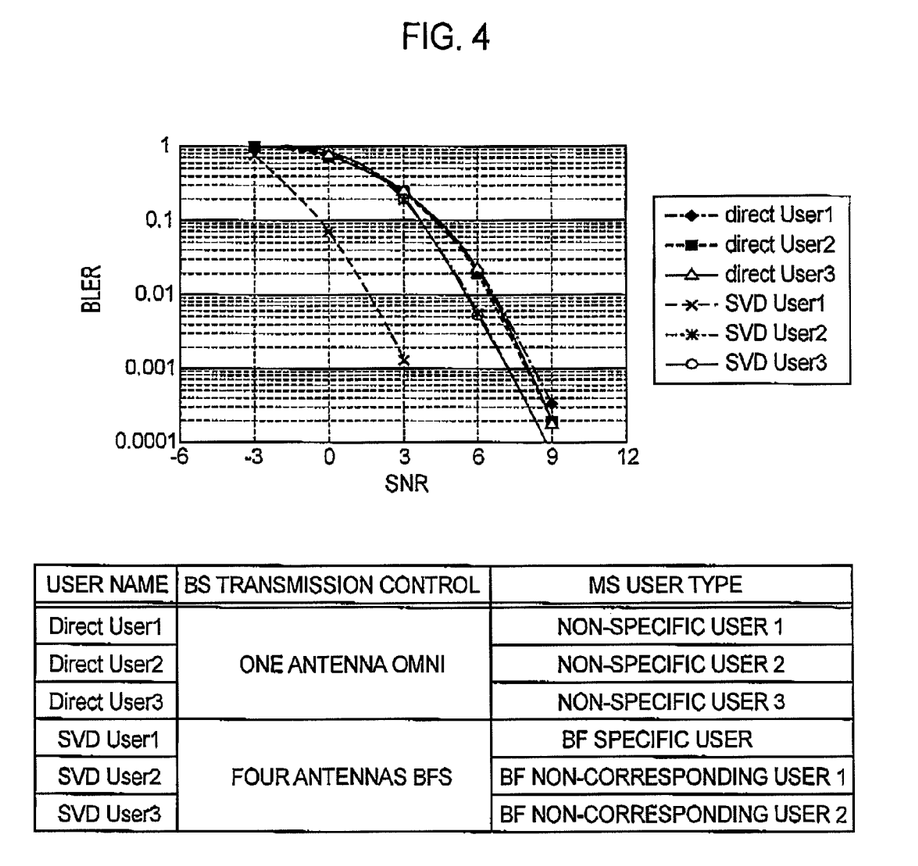
FIG. 4 is a diagram for explaining the effect achieved by the first embodiment.

Next, the effect achieved by the first embodiment is described by taking a concrete example. FIG. 4 is a diagram for explaining the effect achieved by the first embodiment.

FIG. 4 shows characteristics in both of the cases where BF transmission to one BF target terminal is performed using a sub-array antenna including four antennas and where nondirectional transmission (omni-transmission) is performed using one antenna. As shown in FIG. 4, when the BF transmission is performed, the characteristics are improved compared with the case of the omni-transmission. Further, in the BF transmission, characteristics of the radio terminals (SVD User2 and SVD User3) other than the BE target terminals are also improved. This is considered to be because the same effect as cyclic delay diversity (CDD) is achieved.

(5) Advantageous Effects

As described above, according to the first embodiment, the radio base station BS BF-transmits the MAP in the direction where the degraded radio terminal is located. This makes it possible to further improve the probability that the degraded radio terminal can normally receive the MAP.

There has been a problem that, particularly in WiMAX, BF transmission does not effectively function because the MAP is not BF-transmitted even if the radio base station BS supporting the BF transmission is provided. However, the first embodiment can solve this problem.

Further, according to the first embodiment, when there are two or more degraded radio terminals, the radio communication unit 110 divides the antennas ANT1 to ANTn into sub-array antennas corresponding to the number of the degraded radio terminals, and then BF-transmits the MAP in the direction where each of the degraded radio terminals is located, by using each of the sub-array antennas obtained by the division. This makes it possible to improve, even when there are many degraded radio terminals, the probability that these degraded radio terminals can normally receive the MAP.

Second Embodiment

In the first embodiment described above, the antennas ANT1 to ANTn are divided into sub-array antennas in the case of BF-transmitting the MAP to the degraded radio terminals. Whereas, in a second embodiment, a target to be divided is different from that in the first embodiment, and at least one of a frequency band and a time band to be used for radio communication is divided. Specifically, "radio communication resources" in the second embodiment mean the frequency band or time band to be used for radio communication.

Note that only differences from the first embodiment are described in the second embodiment, and redundant description is omitted. The second embodiment is described below in the order of (1) Processing of Dividing Radio Communication Resources, (2) Operations of Radio Base Station, (3) Concrete Example, and (4) Advantageous Effects.

(1) Processing of Dividing Radio Communication Resources

Figure 5:
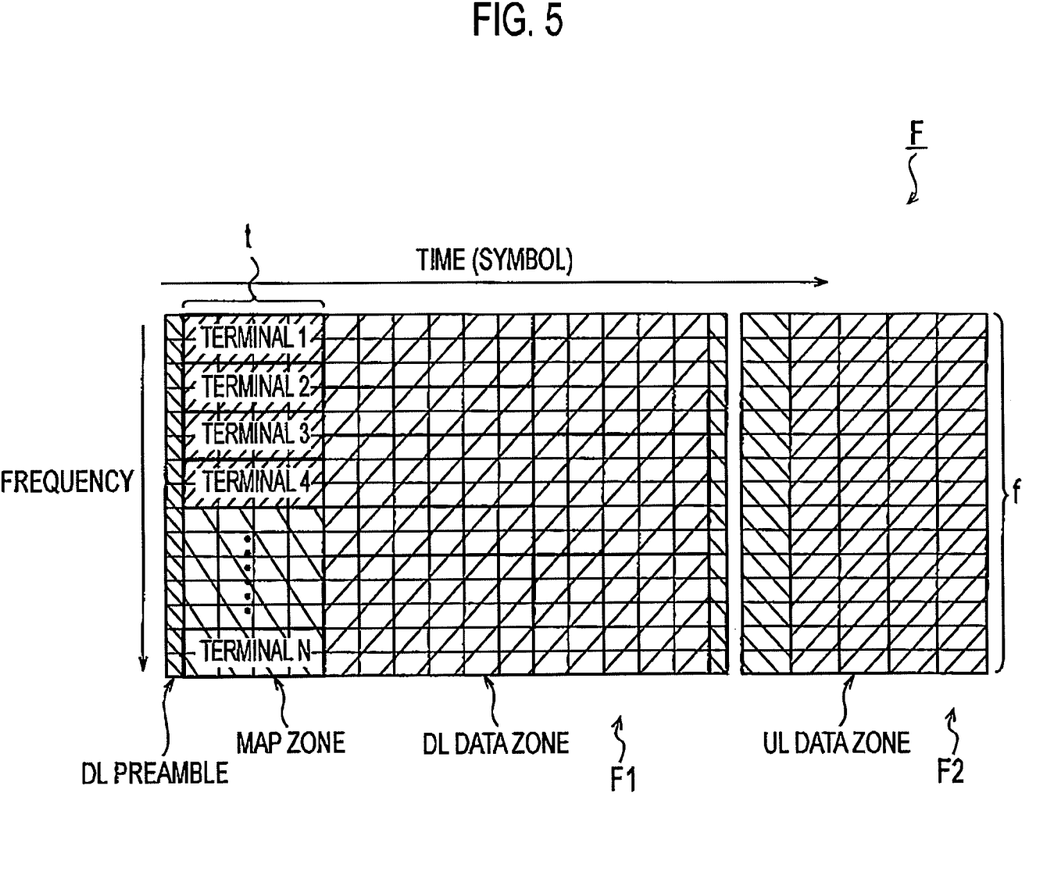
FIG. 5 is a diagram for explaining an example of processing of dividing a frequency band or a time band according to a second embodiment.

FIG. 5 is a diagram showing a configuration of a communication frame F used in the radio communication system 10.

As shown in FIG. 5, the communication frame F has a downlink (DL) sub-frame F1 used for DL communication and an uplink (UL) sub-frame F2 used for UL communication. The DL sub-frame F1 is disposed in the former part of one frame period, while the UL sub-frame F2 is disposed in the latter part of one frame period. The DL sub-frame F1 and the UL sub-frame F2 consist of multiple symbols, respectively.

A preamble that is a known symbol is disposed at the head of the DL sub-frame F1. The DL sub-frame F1 has a MAP zone, where MAP is disposed, after the preamble. Further, the DL sub-frame F1 also has a data zone, where communication data (user data) other than the MAP is disposed, after the MAP zone.

In the example shown in FIG. 5, the MAP zone is divided in a frequency direction. In other words, a frequency band f of the MAP zone is divided into a region for BF target terminal 1, a region for BF target terminal 2, . . . . The MAP is BF-transmitted in each of these regions. To be more specific, the MAP is BF-transmitted in the direction where the BF target terminal 1 is located in the region for BF target terminal 1, while the MAP is BF-transmitted in the direction where the BF target terminal 2 is located in the region for BF target terminal 2.

Note that the MAP zone division is not limited to the division in the frequency direction as shown in FIG. 5, but division in a time direction may be performed. In this case, a time band t of the MAP zone is divided into a region for BF target terminal 1, a region for BF target terminal 2, a region for BF target terminal 3, . . . . The MAP is BF-transmitted in each of these regions.

(2) Operations of Radio Base Station

Figure 6:
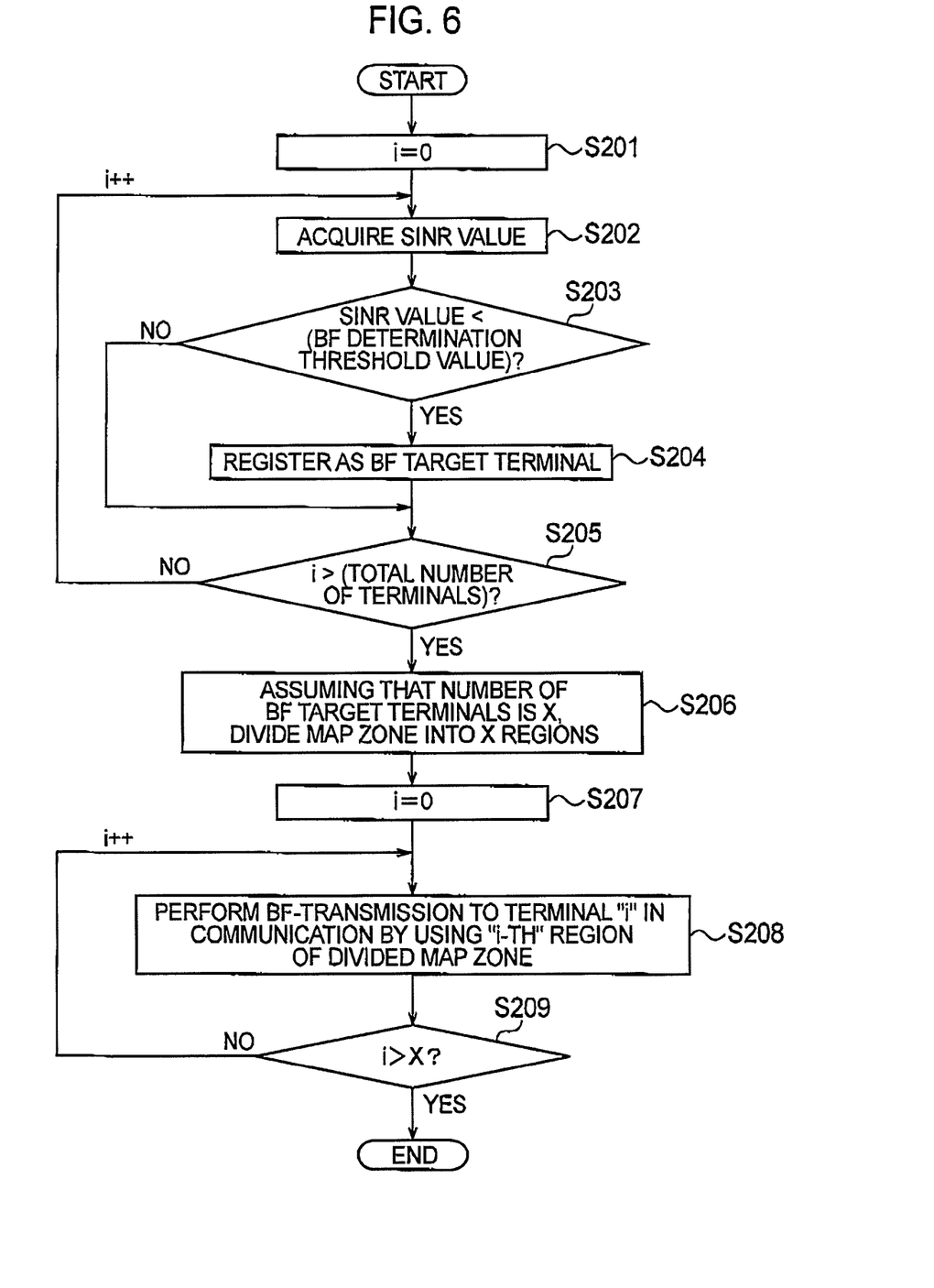
FIG. 6 is a flowchart showing operations of the radio base station according to the second embodiment.

FIG. 6 is a flowchart showing operations of the radio base station BS according to the second embodiment. The processes in Steps S201 to S205 shown in FIG. 6 are the same as those in the first embodiment.

In Step S206, assuming that the number of BF target terminals is X, the transmission control unit 123 divides a MAP zone into X regions in a frequency direction or a time direction.

In Step S207, the control unit 120 initializes a variable for counting the radio terminals MS which execute radio communication with the radio base station BS.

In Step S208, the radio communication unit 110 BF-transmits MAP in the direction where each of the BF target terminals is located, by using each of the regions (frequency regions or time regions) allocated to the BF target terminals by the transmission control unit 123.

In Step S209, the control unit 120 determines whether or not the MAP transmission to all the radio terminals MS which execute radio communication with the radio base station BS is completed. When the MAP transmission is completed, this operational flow is terminated.

(4) Concrete Example

Figure 7:
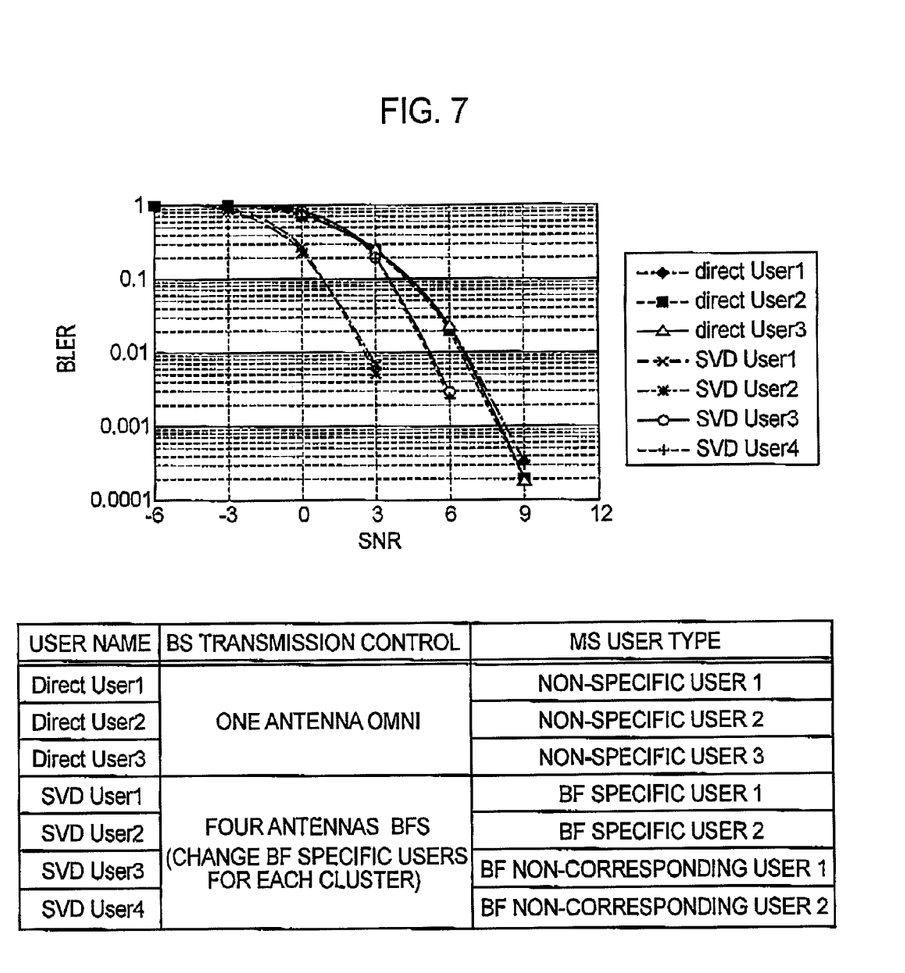
FIG. 7 is a diagram for explaining the effect achieved by the second embodiment.

Next, the effect achieved by the second embodiment is described by taking a concrete example. FIG. 7 is a diagram for explaining the effect achieved by the second embodiment.

FIG. 7 shows characteristics in both of the cases where BF transmission (using four antennas) to two BF target terminals is performed using frequency regions different from each other and where omni-transmission is performed using one antenna. As shown in FIG. 6, when the BF transmission is performed, the characteristics are improved compared with the case of the omni-transmission. Further, in the BF transmission, characteristics of the radio terminals (SVD User3 and SVD User4) other than the BF target terminals are also improved.

(5) Advantageous Effects

As described above, according to the second embodiment, the radio communication unit 110 BF-transmits the MAP in the direction where the degraded radio terminal is located, by using the region including a part of the frequency band f or of the time band t used for MAP transmission. This makes it possible to improve the probability that the degraded radio terminal can normally receive the MAP.

There has been a problem that, particularly in WiMAX, BF transmission does not effectively function because the MAP is not BF-transmitted even if the radio base station BS supporting the BF transmission is provided. The second embodiment can solve this problem.

Further, according to the second embodiment, when there are so two or more degraded radio terminals, the radio communication unit 110 divides the frequency band f or the time band t used for MAP transmission into the regions corresponding to the number of the degraded radio terminals, and then BF-transmits the MAP in the direction where each of the degraded radio terminals is located, by using each of the regions (frequency regions or time regions) obtained by the division. This makes it possible to improve, even when there are many degraded radio terminals, the probability that these degraded radio terminals can normally receive the MAP.

Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, the first and second embodiments described above can be implemented not only independently of each other but also in combination with each other. The implementation of the first and second embodiments in combination with each other makes it possible to improve the probability that many more degraded radio terminals can normally receive the MAP.

Moreover, although the description has been given of the radio communication system 10 having the configuration based on WiMAX (IEEE802.16) in the embodiment described above, the present ao invention is applicable not only to WiMAX but also to LTE (Long Term Evolution) whose standards are pending in 3GPP or next-generation PHS. More specifically, the present invention is applicable to any radio communication system as long as the radio communication system includes a radio base station configured to transmit broadcast control data which is data to be broadcast to radio terminals executing radio communication with the radio base station and is used to control the radio communication.

Note that adopting BF transmission in a narrowband system leads to a problem of occurrence of a null that is a point where directional characteristics are lowered. Meanwhile, in a broadband system such as WiMAX, LTE and next-generation PHS, the null is not directed to the entire bands. In other words, in such a multicarrier communication system, the broadcast control data is BF-transmitted using multiple carriers, and thus no null occurs even in a direction where a null occurs for a certain carrier since a carrier phase is different in another carrier. Therefore, the problem of the null can be avoided in the case of the BF transmission of the broadcast control data. Further, even if a null directed toward a part of the broadband causes a small error, the error can be corrected using powerful error correction.

Further, the processing procedures described above may be implemented as a computer program, and the radio base station may be allowed to execute the computer program.

As described above, it should be understood that the present invention includes various embodiments and the like which are so not described herein. Therefore, the present invention is limited only by items specific to the invention according to claims pertinent based on the foregoing disclosure.

INDUSTRIAL APPLICABILITY

The radio base station and the radio communication method according to the present invention are useful in a radio communication technology such as mobile communication since they can improve the probability that a radio terminal with degraded communication quality can normally receive broadcast control data.

The invention claimed is:
1. A radio base station comprising:
a radio communication unit configured to transmit broadcast control data via radio communication resources including an antenna unit including a number of antennas, the broadcast control data being data common to a plurality of radio terminals executing radio communication with the radio base station and being used to control the radio communication;

an acquisition unit configured to acquire quality information indicating quality of the radio communication between each of the plurality of radio terminals and the radio base station; and an identification unit configured to identify, from the plurality of radio terminals, a number of degraded radio terminals having the quality lower than a threshold value, based on the quality information acquired by the acquisition unit, wherein when the number of degraded radio terminals is one, the radio communication unit performs beam-forming transmission of the broadcast control data in the direction corresponding to the one degraded radio terminal identified by the identification unit, wherein, (a) when there are two or more degraded radio terminals, the radio communication unit divides the antennas of the antenna unit into antenna groups to be used for transmission of the broadcast control data by dividing the number of antennas by the number of degraded radio terminals, and (b) if the number of antennas divided by the number of degraded radio terminals is less than two, the radio communication unit excludes a degraded radio terminal having a highest quality from being considered a degraded radio terminal of the two or more degraded radio terminals, and (c) the radio communication unit repeats (a) and (b) until the number of antennas divided by a number of remaining degraded radio terminals is not less than two, and (d) then the radio communication unit performs beam-forming transmission of the broadcast control data in the direction corresponding to each of the remaining degraded radio terminals, by using each of the antenna groups obtained by the division.

2. The radio base station according to claim 1, wherein the radio communication resources include a frequency band to be used for transmission of the broadcast control data, and when there are two or more degraded radio terminals, the radio communication unit divides the frequency band into frequency regions corresponding to the number of the degraded radio terminals, and then performs beam-forming transmission of the broadcast control data in the direction corresponding to each of the degraded radio terminals, by using one of the frequency regions obtained by the division.

3. The radio base station according to claim 1, wherein the radio communication resources include a time band to be used for transmission of the broadcast control data, and when there are two or more degraded radio terminals, the radio communication unit divides the time band into time regions corresponding to the number of the degraded radio terminals, and then performs beam-forming transmission of the broadcast control data in the direction corresponding to each of the degraded radio terminals, by using one of the time regions obtained by the division.

4. The radio base station according to claim 1, wherein the broadcast control data includes data indicating an allocation result of communication channels used to transmit and receive communication data other than the broadcast control data.

5. The radio base station according to claim 1, wherein the radio communication unit is configured according to a multicarrier communication scheme in which a plurality of carriers are usable for transmission of the broadcast control data.

6. A radio communication method comprising the steps of:

(a) acquiring, by a radio base station having a number of antennas, quality information indicating quality of radio communication between each of a plurality of radio terminals and the radio base station;

(b) identifying, by the radio base station, a number of degraded radio terminals having the quality lower than a threshold value from the plurality of radio terminals, based on the quality information acquired in the acquiring step; and (c) performing, by the radio base station, beam-forming transmission of broadcast control data in the direction corresponding to the degraded radio terminals identified in identifying step (b), the broadcast control data being data common to the plurality of radio terminals and being used to control the radio communication, wherein when there are two or more degraded radio terminals identified in step (b), (d) dividing the number of antennas of the radio base station by the number of degraded radio terminals to form antenna groups and, if the number of antennas divided by the number of degraded radio terminal is less than two, (e) excluding a degraded radio terminal having a highest quality from being considered a degraded radio terminal of the two or more degraded radio terminals, to obtain remaining degraded radio terminals, (f) repeating steps (d) and (e) until the number of antennas divided by the number of remaining degraded radio terminals is not less than two, and (g) then performing beam-forming transmission of the broadcast control data in the direction corresponding to each of the remaining degraded radio terminals, by using each of the antenna groups.

* * * * *